United States Patent
Thornley

(10) Patent No.: US 8,464,245 B2
(45) Date of Patent: Jun. 11, 2013

(54) METHOD AND SYSTEM FOR SOFTWARE VIRTUALIZATION DIRECTLY FROM AN INSTALLATION PACKAGE

(75) Inventor: David G. Thornley, Algonquin, IL (US)

(73) Assignee: Flexera Software LLC, Schaumburg, IL (US)

(*) Notice: Subject to any disclaimer, the term of this patent is extended or adjusted under 35 U.S.C. 154(b) by 553 days.

(21) Appl. No.: 12/438,907

(22) PCT Filed: Jun. 27, 2008

(86) PCT No.: PCT/US2008/068673
§ 371 (c)(1),
(2), (4) Date: Feb. 10, 2010

(87) PCT Pub. No.: WO2009/003189
PCT Pub. Date: Dec. 31, 2008

(65) Prior Publication Data
US 2010/0138823 A1  Jun. 3, 2010

Related U.S. Application Data

(60) Provisional application No. 60/946,623, filed on Jun. 27, 2007.

(51) Int. Cl.
*G06F 9/445* (2006.01)
*G06F 9/455* (2006.01)

(52) U.S. Cl.
USPC .............................. 717/174; 718/1

(58) Field of Classification Search
USPC .............. 717/124–135, 168–178; 714/37, 714/38.1; 718/1
See application file for complete search history.

(56) References Cited

U.S. PATENT DOCUMENTS

| | | | | |
|---|---|---|---|---|
| 5,642,417 A * | 6/1997 | Stringer | ........................ | 717/174 |
| 6,353,926 B1 * | 3/2002 | Parthesarathy et al. | ....... | 717/170 |
| 7,506,338 B2 * | 3/2009 | Alpern et al. | ................. | 717/177 |
| 2004/0139309 A1 | 7/2004 | Gentil et al. | | |
| 2004/0172476 A1 * | 9/2004 | Chapweske | ................... | 709/231 |
| 2004/0243997 A1 * | 12/2004 | Mullen et al. | ................. | 717/174 |
| 2005/0022176 A1 * | 1/2005 | Ramachandran et al. | .... | 717/170 |
| 2006/0047974 A1 * | 3/2006 | Alpern et al. | ................. | 713/191 |
| 2006/0271341 A1 | 11/2006 | Brown et al. | | |
| 2007/0083610 A1 * | 4/2007 | Treder et al. | .................. | 709/217 |
| 2007/0106984 A1 * | 5/2007 | Birk Olsen et al. | ........... | 717/174 |
| 2007/0112574 A1 | 5/2007 | Greene | | |
| 2007/0168956 A1 * | 7/2007 | Moore et al. | .................. | 717/120 |

(Continued)

OTHER PUBLICATIONS

"InstallShield Professional 2000 Version 1," 1999, InstallShield Corp., p. 1-22.*

(Continued)

*Primary Examiner* — Wei Zhen
*Assistant Examiner* — Qing Chen
(74) *Attorney, Agent, or Firm* — Michael A. Glenn; Glenn Patent Group

(57) ABSTRACT

A method and system for providing a virtual system environment directly from an installation package is disclosed. An installation package containing one or more installer applications is received and an installer application providing an instance of an operating system is copied from the installation package to a virtual container created in a test machine. A virtualization package is created for the selected installed application, and the virtual system environment is provided in the test machine.

13 Claims, 3 Drawing Sheets

U.S. PATENT DOCUMENTS

2007/0271552 A1* 11/2007 Pulley .................. 717/120
2008/0010630 A1* 1/2008 Ou-Yang et al. ............. 717/121
2008/0133208 A1* 6/2008 Stringham .................. 703/20
2008/0301676 A1* 12/2008 Alpern et al. .................. 718/1

OTHER PUBLICATIONS

"MSDOS Introduction," <http://uva.ulb.ac.be/cit_courseware/msdos/msdos15.htm>, 1988-2000, p. 1-2.*

Neuendorf et al., "InstallAnywhere, InstallShield Multiplatform and InstallShield Developer," Jul.-Aug. 2002, Journal of Object Technology, vol. 1, No. 2, p. 175-181.*

"Zero G Software's InstallAnywhere 7 Sets New Standard for Multiplatform Software Deployment," May 16, 2005, Zero G Software, Inc.*

Alpern et al., "PDS: A Virtual Execution Environment for Software Deployment," Jun. 2005, ACM, p. 175-185.*

"InstallAnywhere 8 Evaluator's Guide," 2006, Macrovision Corp., p. 1-30.*

Honeycutt, "Microsoft Virtual PC" Microsoft Virtual PC 2004 Technical Overview; published Nov. 2003.

* cited by examiner

METHOD AND SYSTEM FOR SOFTWARE VIRTUALIZATION DIRECTLY FROM AN INSTALLATION PACKAGE

FIELD

The field of the invention relates generally to software virtualization. In particular, the present method and system is directed to virtualization of an application directly from an installation package.

BACKGROUND

Software virtualization allows for testing and installing software applications, operating system (OS) updates or the like that require overwriting system registries and system-specific common files during installation without changing the configuration of the test machine. Software virtualization mucks up the registry, dynamic linking libraries (DLLs) and other system files required for an installation (or an update) of software by creating them in a virtual cache without disturbing the test machine's current configuration. This feature of virtual installation is very useful during software development, testing and quality assurance where the deployment of new software requires testing on multiple platforms and configurations. Usually every possible combination of platforms and configurations for testing is impossible to perform.

After various versions of software, applications and operating systems are virtually installed, system files are stored or readily available from a virtual cache, the operator can easily turn on and off, or changes versions from one to another without rebooting the test machine.

VMWARE® virtualization software of VMWARE Inc., Palo Alto, Calif., offers virtualization of various operating systems, configurations or versions of one or more operating systems on a single personal computer. However, virtualization by VMWARE virtualization software are is distinguishable from software virtualization because it is, in essence, a hardware virtualization; VMWARE virtualization software transforms the hardware resources, such as CPU, memory, hard disk, network controller, peripheral devices, etc., to create a fully functional virtual machine that can run its own operating system and applications as if it operates on another PC. Presently, VMWARE virtualization software virtualizes x86 processors only.

Prior software virtualizations require that virtualized machine images be maintained in the limited read-only memory (ROM) of the test machine to retain them after the machine is turned off. Furthermore, in order to test a software application on multiple machines, each machine needs to be tested separately in a serial fashion, which requires interruption and time of the operator who carries out the testing. Moreover, current techniques for software virtualization have risks for corruption of files resident on the machine on which the software virtualization takes place.

SUMMARY

A method and system for providing a virtual system environment directly from an installation package is disclosed. An installation package containing one or more installer applications is received and an installer application providing an instance of an operating system is copied from the installation package to a virtual container created in a test machine. A virtualization package is created for the selected installed application, and the virtual system environment is provided in the test machine.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

Figure 1:
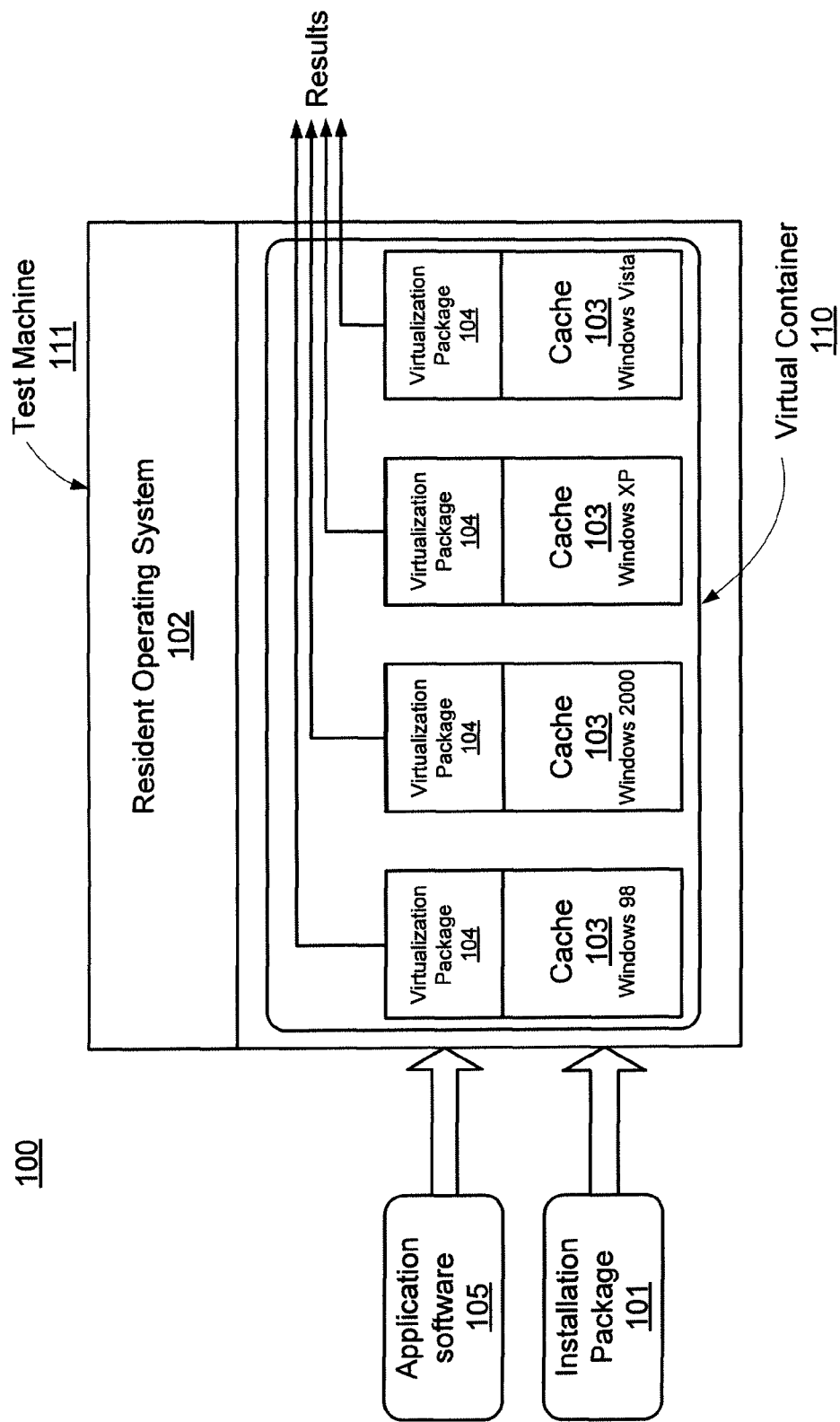
FIG. 1 illustrates an exemplary process for providing software virtualization from an installation package, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

A method and system for providing a virtual system environment directly from an installation package is disclosed. In one embodiment, the method comprises receiving an installation package that contains one or more installer applications. An installer application providing an instance of an operating system is copied from the installation package to a virtual container created in a test machine. A virtualization package is created for the selected installed application, and the virtual system environment is provided in the test machine.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

As used herein, the following terms shall have the following meanings without regard to its upper or lower case usage.

"Back-end" refers to a server, computer or system under the control or otherwise authorized by a software vendor to receive and process information received from a customer of its usage of software licensed to the customer by the vendor.

"Customer" means a licensee of licensed software.

"File" refers to what is generally understood as a computer file, but as used here also includes any system for storing and retrieving digital data, inclusive of database managers, registries, directories and data objects.

"Front-end" refers to a server, computer or system under the control or otherwise authorized by a customer to execute, manage and/or report usage of software licensed to the customer.

"Server" means a computer process that other computer applications, operating systems, system software or compute services interact with. Within this definition, server as used in the terms "client-server," "multi-tier computing," "3-tier computing," network services or Web services are included.

"Vendor" means a licensor of licensed software including its copyright owner and other parties granted a right by the copyright owner to sell or otherwise distribute licenses to customers to use the licensed software.

Software virtualization may not be applied to an existing application that has previously been installed, thus already changed and updated system files. In this case, the application is uninstalled and reinstalled virtually.

Virtual operating system (VOS) refers to an operating system that runs in a virtual system environment. VOS allows running an application without installing a specific operating system on which the application is running or without modifying the resident operating system (i.e., running a software application and operating system update on a machine without impacting the underlying machine). Running an application on a VOS may involve the following process. An execution (EXE) file of the VOS is loaded from the virtual file system that stores a virtual system environment. In the process of loading the EXE file, the VOS loads system-dependent files such as COM, DLL and EXE files located on the resident operating system as well as the virtual system environment. The VOS is responsible for providing full control over the system file and registry keys to avoid system crashes and access denials that may occur during the execution of the application. Thereafter, the application specific to the VOS is loaded and executed in the virtual system environment. The processes of the application are managed and monitored by the VOS. This allows the application to run without installing an operating system and/or physical drivers or rebooting the test machine.

Virtual file system (VFS) is a compressed file system that stores VOS, virtual system files, virtual registry keys and/or other files that are required to prepare a virtual system environment. VFS is typically embedded in an archive as distributed and gets extracted into the system memory in small blocks when required by a virtual application. At runtime, the virtual application accesses the resident system files as well as the virtual files that are available from the system memory. From the operator's perspective, virtual files are not distinguishable from resident system files as the virtual operating system seamlessly isolates and encapsulates the access to the virtual files as if they were resident system files. VOS also manages the version of virtual system files when the virtual system files in the VFS are overwritten. VFS works with any underlying file system including FAT16, FAT32, NTFS or any future file system.

Virtual registry (VREG) transparently merges virtual registry keys with the resident registry keys. For example, when a virtual application is being launched, the VOS automatically gathers all the registry keys needed by COM components before deploying it. Virtual registry keys are overlaid on the resident registry, so that the virtual application utilizes entries from both the virtual and resident system. When a new key is required, the virtual registry is checked for a match. If no match is found, the resident system registry is used. Since virtual registry keys are provided to all applications and libraries loaded through the VOS, several advantages are achieved. According to one embodiment, virtual registry allows COM- or ActiveX-based applications to run on systems where registry access is restricted. Since the COM or ActiveX components are directly loaded from the VFS, potential issues regarding unintentional removal of those components during another application's uninstall are completely removed. Furthermore, virtual registry resides inside the application's EXE, it cannot be misconfigured by another program's installer or uninstaller. In addition, virtual registry also tracks COM objects for their lifetime so that it can free DLL and EXE servers appropriately when the COM objects are deleted.

According to one embodiment, a virtual container emulates one or more versions of installer applications. An installation package includes one or more installer applications to provide various instances and versions of operating systems such as MICROSOFT WINDOWS 98®, MICROSOFT WINDOWS 2000®, MICROSOFT WINDOWS XP® and MICROSOFT WINDOWS VISTA® or more than one versions of service packages for a specific operating system. Installation packages may be distributed on a CD-ROM or by an image file over a network. An installer application may be a Microsoft installer (MSI), an update or a service package of an operating system but is not limited thereto. In case of software testing, the installer package includes several versions of installer applications to perform quality assurance (QA) or compatibility testing for an application software. After the operator selects a version from the set of versions available for an application software, a series of processes launches the application and prepares a virtual system environment. A VOS is copied from the installation package to the virtual container. System files necessary to run the application are also copied to a 'virtual instance' of the application created by the VOS, and finally the application is launched on the virtual instance.

FIG. 1 illustrates an exemplary process for providing software virtualization from an installation package, according to one embodiment. The operator of test machine 111 is provided with an installation package 101 and an application software 105. Resident operating system 102 is installed on test machine 111. The application software 105 is to be tested on various instances or versions of operating systems, for example, MICROSOFT WINDOWS 98, MICROSOFT WINDOWS 2000, MICROSOFT WINDOWS XP, MICROSOFT WINDOWS XP service pack 1 and 2 and MICROSOFT WINDOWS VISTA. According to one embodiment, installation package 101 includes one or more instances or versions of operating systems on which the software application 105 is to be tested. The application software 105 includes an application developed to work with a specific operating system as well as an operating system update (e.g., from service pack 1 to service pack 2) on an instance or a version of resident operating system 102. It is appreciated that application software 105 may be any other software that is tested on test machine 111 running on resident operating system 102. Further, the software virtualization system 100 may be running on the test machine in combination with a hardware virtualization system such as VMWARE virtualization software.

According to one embodiment, an installation package 101 contains various instances or versions of operating systems, exchangeably referred to as target operating systems or target systems hereinafter. The operator selects all or part of the various instances or versions of operating systems contained in the installation package 101 and copies them onto a virtual cache 103 for each instance or version of an operating system. The virtual caches 103 are collectively stored in a virtual container 110. In order to test the application software 105, a template virtualization package 104 is created for each virtual cache 103. Each virtualization package 104 created in virtual cache 103 contains a virtual operating system, a virtual file system, virtual registries and any other information specific to a target operating system. The application software 105 is run inside a target virtualization package 104 without affecting the resident operating system 102 and/or other software applications installed on the test machine 111.

According to one embodiment, the operator of the test machine 111 selects a virtualization package for testing inside the virtual container 110. According to another embodiment, a batch program automatically select a list of virtualization packages for testing, and the application software 105 is run for each virtualization package. When being run inside a virtual package 104, the application software 105 is isolated from the test machine's operating system 102 and other applications installed on the test machine. The virtual cache 103 may be application-specific. In this case, modifications from the virtualization package do not change the underlying system setup but persist in the application-specific virtual cache 103.

According to one embodiment, the operator of test machine 111 configures the location of a virtual cache 103. For example, for a CITRIX product offered by CITRIX SYSTEMS Inc., the virtualization cache 103 is located at a cache presentation server (not shown in FIG. 1). For THINSTALL offered by VMWARE Inc., the virtualization cache 103 is located where the user's application data folder resides. THINSTALL I provides for a globally unique identifier ("GUID") for each application that runs in a virtual container 110 on test machine 111.

According to one embodiment, a user of test machine 111 is able to view the virtual file system of virtual caches 103 and evaluate what effect the installation package 101 would have had on the resident file system of the test machine 111, had it been run outside of the virtual container 110. The user also views what entries were made in the virtualized registry and can determine what effect the selected installation package would have had on the resident registry of the test machine 111, had it been run outside of the virtualization container 110. For example, if the user experiences problems with a shared dynamic link library (DLL), the user views what the installation package would have done to the DLLs of the test machine 111. Software applications installed by virtual installation may be run in the virtual container 110 to verify whether or not they function properly without impacting the performance of the test machine 111.

According to one embodiment, the user deletes the virtualization package 104 when the test run is completed, leaving the machine in the state it was in before the test began. The user may save the virtualization package 104 in a local storage of test machine 111, and the saved virtualization package 104 may be referenced or reused later for other purposes.

Embodiments of the software virtualization scheme disclosed herein may be applied to an existing software product. For example, ADMINSTUDIO, a software product supplied by ACRESSO SOFTWARE, has an existing feature called INSTALLMONITOR, which allows ADMINSTUDIO to monitor the WINDOWS application programming interfaces (APIs") that are related to a software installation. When used in conjunction with software virtualization, INSTALLMONITOR allows a user to run an installation package (e.g., MSI package) as a virtualized application without having to reverse engineer the installation package's content.

There are several ways in which a user can trigger a virtualized application instance from the installation package 101. For example, an installation service installs a shortcut for a virtualization package 104 directly from an installation package 101 on the test machine 111. When clicked by the user, the shortcut refers back to the installation service and starts the application in a virtualized mode. For streamlining evaluation for application software 105, a software tool may be run to allow the user to browse the installation package 101 and select a shortcut for a virtual package 104 created from the installation package 101.

According to one embodiment, the application software 105 or system updates are run and monitored to trap the API calls that try to modify the underlying operating system. For instance, INSTALLMONITOR has such a monitoring feature. Those trapped API calls are redirected to the virtualization package 104 and corresponding API calls created in the virtualization package or are called instead.

According to one embodiment, package code, product code, Message Digest 5 ("MD5") hash of an installation package and other installation-specific information are saved so that the installation service can verify that the underlying installation package has not changed. It allows users to verify that it is a proper virtual container and that the virtual container is in proper working order.

According to one embodiment, virtualization package 104 is saved to a user-specific or application-specific data folder. Application software 105 is then run within the virtual container 110. Therefore, application software 105 runs without affecting the test machine's resident operating system 102 or on other applications previously installed on the test machine. The saved user-specific or application-specific data folders may be referenced later without creating a new virtualization package 104 for a specific target system to be tested.

Figure 2:
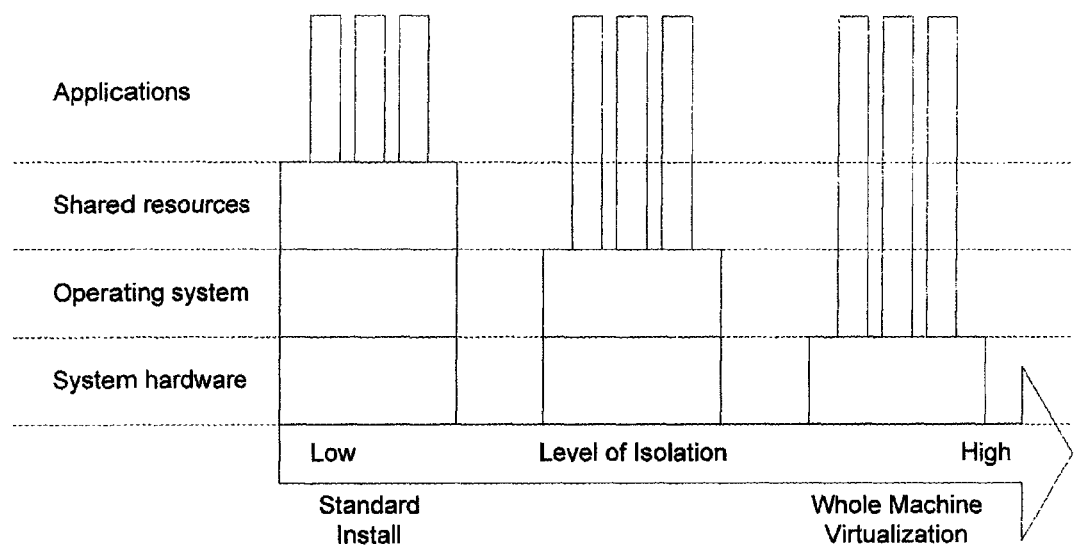
FIG. 2 illustrates exemplary levels of isolation for achieving software virtualization, according to one embodiment.

FIG. 2 illustrates exemplary levels of isolation for achieving software virtualization, according to one embodiment. For standard software installation where the level of isolation is low, the resident system hardware, operating system and shared resources of a test machine remain unchanged, and only the applications specific to the test machine are run. The present software virtualization scheme where the level of isolation is high, allows running an application software on a version or instance of a target operating system that is different from the resident operating system of the test machine. Version control and software testing on various operating systems are facilitated using embodiments of the present software virtualization process.

Figure 3:
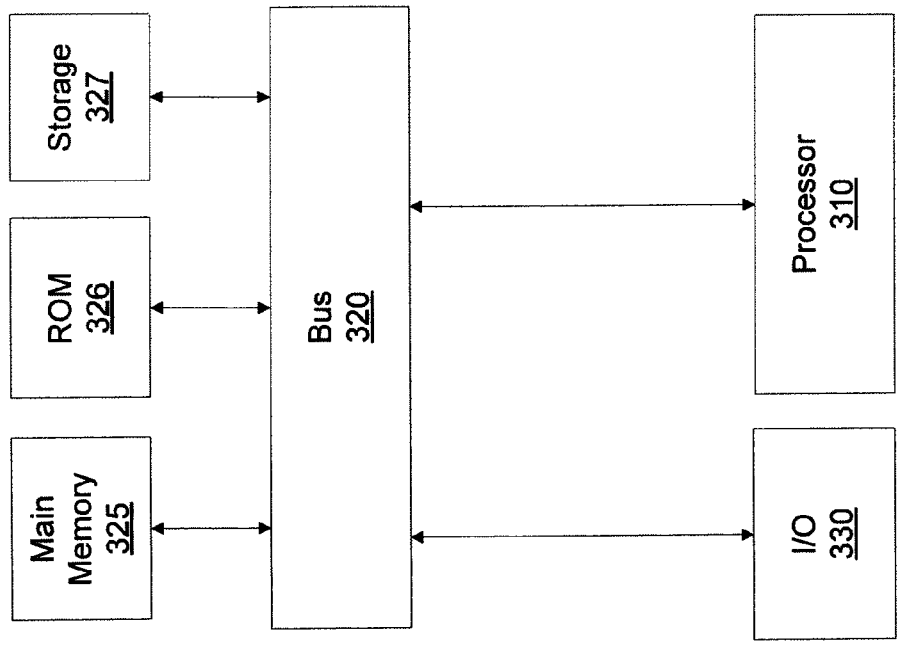
FIG. 3 illustrates an exemplary computer architecture for use with the present system, according to one embodiment.
Figure 3:
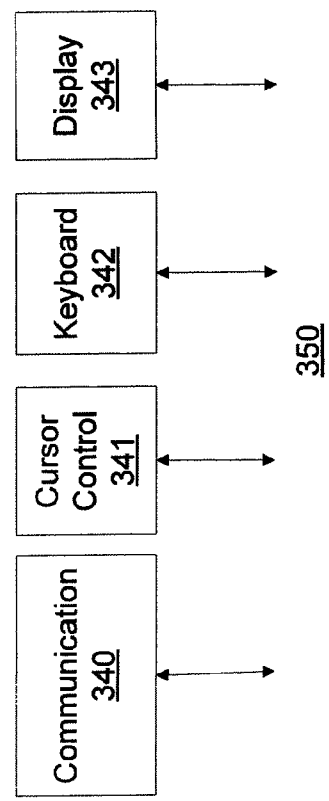

FIG. 3 illustrates an exemplary computer architecture 300 for use with the present system, according to one embodiment. Computer architecture 300 can be used to implement a test machine 111. One embodiment of architecture 300 comprises a system bus 320 for communicating information, and a processor 310 coupled to bus 320 for processing information. Architecture 300 further comprises a random access memory (RAM) or other dynamic storage device 325 (referred to herein as main memory), coupled to bus 320 for storing information and instructions to be executed by processor 310. Main memory 325 also may be used for storing temporary variables or other intermediate information during execution of instructions by processor 310. Architecture 300 also may include a read only memory (ROM) and/or other static storage device 326 coupled to bus 320 for storing static information and instructions used by processor 310.

A data storage device 327 such as a magnetic disk or optical disc and its corresponding drive may also be coupled to computer system 300 for storing information and instructions. Architecture 300 can also be coupled to a second I/O bus 350 via an I/O interface 330. A plurality of I/O devices may be coupled to I/O bus 350, including a display device 343, an input device (e.g., an alphanumeric input device 342 and/or a cursor control device 341).

The communication device 340 allows for access to other computers (servers or clients) via a network. The communication device 340 may comprise a modem, a network interface card, a wireless network interface or other well known interface device, such as those used for coupling to Ethernet, token ring, or other types of networks.

A method and system for providing a virtual system environment has been described with respect to specific examples and subsystems. It will be apparent to those of ordinary skill in the art that it is not limited to these specific examples or subsystems but extends to other embodiments as well.

I claim:

1. A computer-implemented method for providing a virtual system environment, comprising:
   receiving an installation package containing one or more installer applications and a software application, wherein each of the one or more installer applications provides an instance of a target operating system and an instance of the software application compatible with the instance of the target operating system;
   copying at least one installer application from the installation package to a virtual container created in a test machine, wherein the virtual container contains at least one virtual cache;
   creating a virtualization package within each of the at least one virtual cache for each of the at least one installer application, wherein the virtualization package comprises at least: a virtual operating system, a virtual file system and at least one virtual registry specific to the target operating system; and
   running the software application for each of the one or more installer applications in the virtual system environment.

2. The computer-implemented method of claim 1, wherein the at least one installer application performs quality assurance (QA) or compatibility testing of an application software.

3. The computer-implemented method of claim 1, wherein a user browses the installation package and selects the at least one installer application from the installation package using a browsing software.

4. The computer-implemented method of claim 1, further comprising:
   identifying the one or more installer applications from the installation package using a batch software program.

5. The computer-implemented method of claim 1, further comprising:
   creating a shortcut on the test machine using an installation service, wherein the shortcut contains information about the software application; and
   running the software application by clicking on the shortcut.

6. The computer-implemented method of claim 1, wherein the virtualization package is saved to a user-specific or application-specific data folder.

7. A non-transitory computer-readable medium having stored thereon a plurality of instructions, wherein the plurality of instructions, when executed by a computer, cause the computer to perform computer-implemented operations of:
   receiving an installation package containing one or more installer applications and a software application, wherein each of the one or more installer applications provides an instance of a target operating system and an instance of the software application compatible with the instance of the target operating system;
   copying at least one installer application from the installation package to a virtual container created in a test machine, wherein the virtual container contains at least one virtual cache;
   creating a virtualization package within each of the at least one virtual cache for each of the at least one installer application, wherein the virtualization package comprises at least: a virtual operating system, a virtual file system and at least one virtual registry specific to the target operating system; and
   running the software application for each of the one or more installer applications in a virtual system environment.

8. The non-transitory computer-readable medium of claim 7, wherein the one or more installer applications include an installer, an update or a service package of the target operating system.

9. The non-transitory computer-readable medium of claim 7, wherein the at least one installer application performs quality assurance (QA) or compatibility testing of an application software.

10. The non-transitory computer-readable medium of claim 7, wherein a user browses the installation package and selects the at least one installer application from the installation package using a browsing software.

11. The non-transitory computer-readable medium of claim 7, having stored thereon additional instructions, wherein the additional instructions when executed by the computer, cause the computer to further perform computer-implemented operation of:
   identifying the one or more installer applications from the installation package using a batch software program.

12. The non-transitory computer-readable medium of claim 7, having stored thereon additional instructions, wherein the additional instructions when executed by the computer, cause the computer to further perform computer-implemented operations of:
   creating a shortcut on the test machine using an installation service, wherein the shortcut contains information about the software application; and
   running the software application by clicking on the shortcut.

13. The non-transitory computer-readable medium of claim 7, wherein the virtualization package is saved to a user-specific or application-specific data folder.

\* \* \* \* \*